United States Patent
Wierzbicki et al.

(10) Patent No.: US 6,216,011 B1
(45) Date of Patent: Apr. 10, 2001

(54) MOBILE UNIT FOR ACCOMMODATING NETWORK MUTE FEATURE IN WIRELESS TELECOMMUNICATIONS SYSTEMS

(75) Inventors: Alex Lawrence Wierzbicki, Bolingbrook; Randall Joe Wilson, Naperville, both of IL (US)

(73) Assignee: Lucent Technologies Inc., DE (US)

( * ) Notice: Subject to any disclaimer, the term of this patent is extended or adjusted under 35 U.S.C. 154(b) by 0 days.

(21) Appl. No.: 09/159,366

(22) Filed: Sep. 23, 1998

(51) Int. Cl.$^7$ ............................................. H04B 7/24
(52) U.S. Cl. ..................... 455/550; 455/414; 455/416
(58) Field of Search ....................... 455/414, 416, 455/417, 567, 422, 445, 458, 507, 517, 560, 550

(56) References Cited

U.S. PATENT DOCUMENTS

| | | | |
|---|---|---|---|
| 4,658,435 | * | 4/1987 | Childress et al. .................... 455/17 |
| 5,212,823 | * | 5/1993 | Fujii et al. ......................... 455/54.1 |
| 5,724,416 | | 3/1998 | Foladare et al. ...................... 379/202 |
| 5,819,171 | * | 10/1998 | Hoogerwerf et al. ............... 455/410 |
| 5,956,635 | * | 9/1999 | Hoogerwerf et al. ............... 455/411 |

FOREIGN PATENT DOCUMENTS

| | | | |
|---|---|---|---|
| 0918442 | 11/1998 | (EP) | ............................... H04Q/7/22 |
| WO9809374 | 3/1998 | (WO) | ............................... H03G/3/34 |

* cited by examiner

*Primary Examiner*—Daniel Hunter
*Assistant Examiner*—Thuan T. Nguyen

(57) ABSTRACT

A mobile unit deployed in a wireless telecommunications system includes a network mute feature. Activation of the network mute feature initiates a signaling protocol in which a network mute activation request is extended by the mobile unit to a serving base station. Deactivation of the network mute feature also requires the mobile unit to generate a signal which is extended to the serving base station. Advantageously, the network mute feature not only mutes the microphone of the mobile unit but also eliminates disruptive noise associated with wireless transmissions.

9 Claims, 6 Drawing Sheets

MOBILE UNIT FOR ACCOMMODATING NETWORK MUTE FEATURE IN WIRELESS TELECOMMUNICATIONS SYSTEMS

CROSS-REFERENCE TO RELATED APPLICATION

This application is related to the application of Alex Lawrence Wierzbicki and Randall Joe Wilson entitled "Network Mute Feature In Wireless Telecommunications Systems" which application is assigned to the assignee of the present application and which is being filed concurrently herewith.

TECHNICAL FIELD

This invention relates to telecommunications systems, and more particularly to the mute function associated with mobile units deployed in wireless telecommunications systems.

BACKGROUND OF THE INVENTION

The explosive growth of wireless telecommunications is evidence of modem society's expectation for almost instantaneous access to information. The decreased cost associated with wireless (mobile) handsets and the enhanced reliability of wireless transmissions has made mobile telecommunications a viable option for almost everyone. Indeed, it is now common for mobile subscribers to use wireless telecommunications services for all types of transactions. Traditional voice and data transmissions (e.g., facsimiles) are commonplace for even unsophisticated mobile subscribers. For others (e.g., those subscribers who conduct business via their mobile units), wireless telecommunications serves as a lifeline to customers and the office.

A well known staple of the business world is the conference call. A conference call is a meeting in which typically one or more parties participates in the discussion via telephone. As more business people travel and conduct their lives from airports and automobiles, it is becoming increasingly common for at least one conference call participant to be using a mobile unit served by a wireless telecommunications network. Although improvements have been made, the quality of a conference call is often a deterrent to a successful meeting. The less-than-optimal quality of a conference call, coupled with the ambient background noise associated with transmission by a wireless telecommunications network, is sometimes so intolerable that mobile conference call participants are asked to drop off from the call so that the rest of the participants may discuss matters with decreased distraction. Although most mobile units have a "mute" function, this function only deactivates the microphone of the mobile unit. Ambient noise associated with wireless transmission still flows to the other party via the wireless telecommunications network.

For the foregoing reasons, there is a need in the art to enhance the ability of a mobile user to participate in a conference call.

SUMMARY OF THE INVENTION

This need has been addressed and a technological advance is achieved in the wireless telecommunications art by a network mute feature on a mobile unit.

More particularly, a network mute function button is found on a mobile unit. Typically, the network mute function is used by a mobile user during participation in a conference call in which the other parties participating in the call are subject to the ambient noise associated with the mobile user's environment and the wireless telecommunications network. Activation of the network mute function causes the mobile unit to send a signaling message to the mobile switching center which decouples a voice path interconnecting the mobile user to another party. The mobile switching center subsequently interconnects the voice path to a noise generator. The noise generator provides non-obtrusive background noise which is heard only by the other party. The purpose of the background noise is to assure the other party that the mobile user is still on the line and can hear the conversation.

Advantageously, the network mute function actually mutes the mobile unit microphone and noise associated with the wireless telecommunications systems. In other words, the network mute function not only mutes the microphone with the mobile unit but also eliminates wireless network noise associated with the wireless telecommunications system interconnecting the mobile user to another party.

DETAILED DESCRIPTION

Figure 1A:
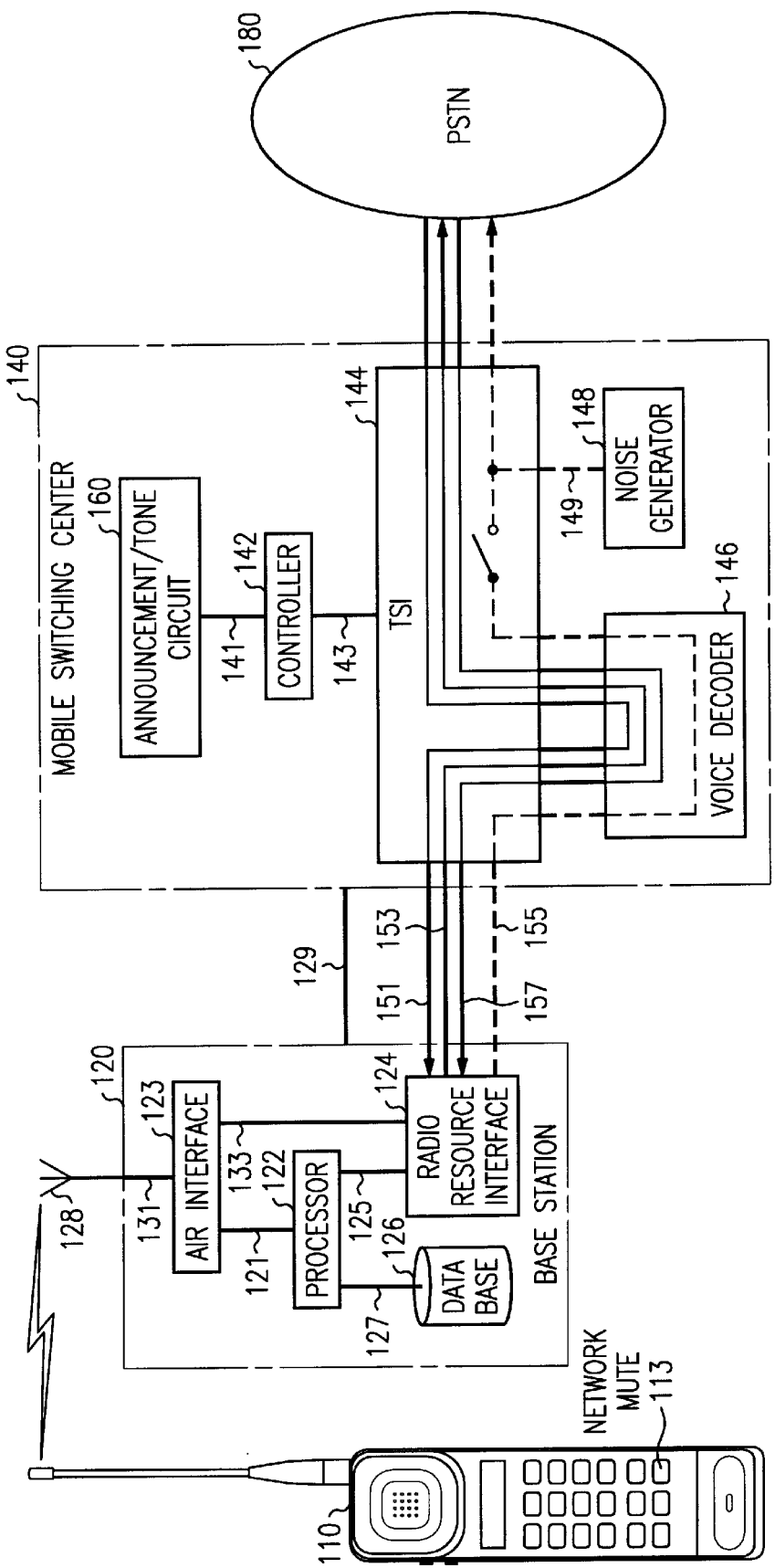
FIGS. 1A and 1B are simplified block diagrams of a wireless telecommunications system in which the present invention may be practiced.

FIG. 1A shows wireless telecommunications system 100 including mobile unit 110, base station 120 and mobile switching center 140. Also shown is public switched telephone network (PSTN) 180 which serves all other wireline and wireless subscribers.

In this example, mobile unit 110 (including network mute button 113) is served by base station 120. Base station 120 includes processor 122 interconnected to air interface 123, radio resource interface 124 and database 126 via links 121, 125 and 127, respectively. Also shown is antenna 128 interconnected to air interface 123 via link 131. Air interface 123 is interconnected to radio resources 124 via link 133.

Mobile switching center (MSC) 140 comprises controller 142 interconnected to announcement/tone generation circuit 160 via link 141. Timeslot interchanger (TSI) 144 is interconnected to the controller via link 143. Also shown are voice decoder 146 and noise generator 148 interconnected to TSI 144 via voice paths.

During operation, voice paths are established from radio resources 124 through TSI 144 to PSTN 180. In this example, non-muted voice paths 151, 153 are shown emanating from radio resource interface 124, passing through voice decoder 146 and terminating at PSTN 180. More particularly, voice path 151 interconnects the mobile user to the called party served by the PSTN while voice path 153 interconnects the called party to the mobile user. Alternatively, voice paths 151, 153 could have been shown as a single bidirectional voice path. Voice decoder 146 is used in digital wireless systems (e.g., CDMA or TDMA systems) for processing the normally compressed voice signals received. The voice decoder decompresses the voice signals and converts these signals to a pulse code modulation format recognizable by the PSTN. Significantly, voice decoder 146 is not present in analog wireless telecommunications systems. Also shown is network me voice path 155 and its counterpart voice path 157. In this case, voice path 155 (from the mobile user to the called party) emanates from radio resource interface 124, passes through voice decoder 146 and is opened prior to connection to the called party served by the PSTN. The remaining portion of voice path 155 (that is, the portion of the path still interconnected to the called party) is interconnected to link 149. Link 149, emanating from noise generator 148, is interconnected to voice path 155 so that non-obtrusive background noise is supplied to voice path 155 by the noise generator before termination to the called party. By opening voice path 155 within TSI 144, the ambient noise associated with the mobile user's environment and wireless transmission is not passed to the called party served by the PSTN. Instead the called party hears non-obtrusive background noise so that the called party is aware that the mobile user is still on the line without being subject to the disturbances associated with wireless transmission. Significantly, voice path 157 interconnecting the called party to the mobile user is not opened. In other words, the mobile user can hear all conversation initiated by the called party.

Figure 1B:
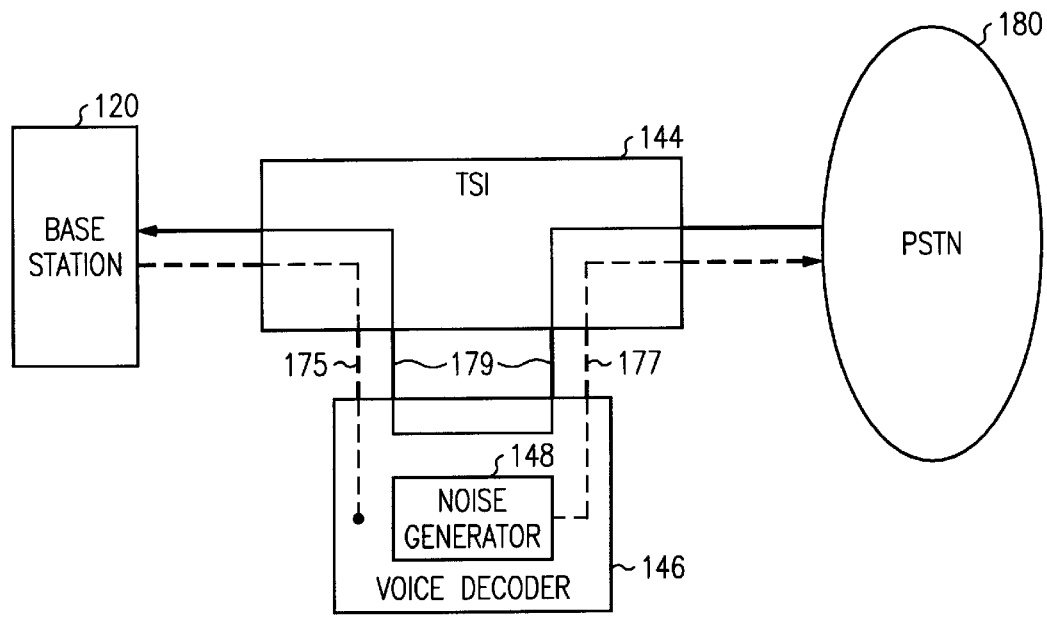

FIG. 1B shows an alternative embodiment for TSI 144, voice decoder 146 and noise generator 148. In this embodiment, the noise generator is disposed within the voice decoder. In this example, first leg 175 of a network muted voice path terminates in voice decoder 146 while second leg 177 of the network muted voice path emanates from noise generator 148 and terminates to the called party. Voice path 179 interconnecting the called party to the mobile unit is not affected by the network mute function. In other words, the mobile unit user is able to hear all transmissions originated by the called party.

Figure 2A:
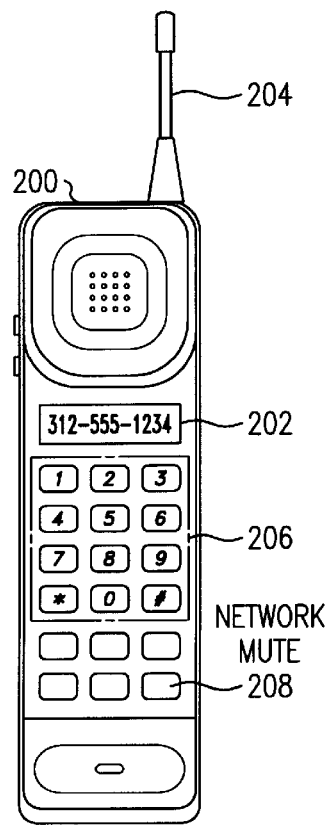
FIG. 2A is a front view of a typical mobile handset with mute function.

FIG. 2A shows a front view of a typical mobile unit 200. Mobile unit 200 comprises visual display screen 202, antenna 204, a plurality of function buttons, collectively referenced as function buttons 206, and mute network function button 208.

Figure 2B:
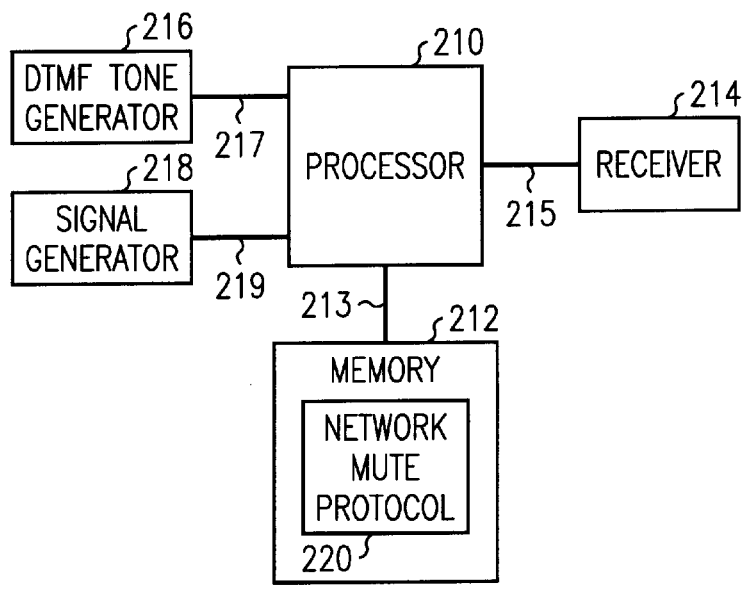
FIG. 2B is a simplified block diagram of the internal components of the mobile handset shown in FIG. 2A.

FIG. 2B shows the internal components of mobile unit 200 shown in FIG. 2A. More particularly, mobile unit 200 comprises processor 210 interconnected to memory 212 via link 213. Radio frequency receiver 214, dual tone multifrequency (DTMF) tone generator 216 and signal generator 218 are shown interconnected to the processor via links 215, 217 and 219, respectively. Processor 210 is responsible for administering and managing all functions of the mobile unit. Radio receiver 214 receives radio frequency signals via antenna 204. DTMF tone generator 216 is interconnected to function buttons 206 for generating a specific DTMF tone for each button. DTMF tone generator 216 is also interconnected and generates a particular DTMF tone for network mute function button 208. Signal generator 218 extends radio frequency signals from the mobile unit to the PSTN via antenna 204. Memory 212 stores data associated with mobile unit 200.

In the preferred embodiment, memory 212 includes memory segment 220 which stores a signaling protocol relating to operation of network mute function button 208. More particularly, the signaling protocol stored in segment 220 is accessed by processor 210 upon receipt of a network mute request. When the network mute button is activated, processor 210 extends a network mute request to a serving mobile switching center (via a base station) in an established signaling format such as IS 95, "blank and burst" signaling or IS 136.

Figure 3:
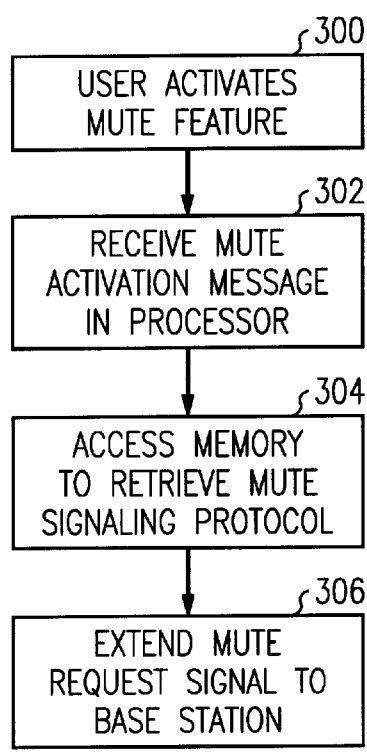
FIG. 3 is a flow diagram depicting the steps performed by a mobile handset for activating a network mute function.

FIG. 3 is a flow diagram depicting the steps performed in a mobile unit for activation of the network mute function. The process begins in step 300 in which the user of the mobile unit activates the network mute feature by depressing a mute button. In step 302, a DTMF tone corresponding to the network mute function is received in the processor of the mobile unit. In mobile unit 200, DTMF tone generator 216 generates a specific tone associated with network mute function button 208 and extends this specific tone to processor 210 over link 217. In step 304, the processor receives the mute request and accesses its memory to retrieve a signaling protocol associated with the network mute function. In this example, processor 210 accesses memory segment 220 for the network mute signaling protocol. In step 306, processor 210 instructs signal generator 218 to extend a network mute request signal to a serving base station. The network mute request signal is extended to the serving base station via a radio frequency protocol such as IS 95, IS 136, "blank and burst" signaling or direct transfer application part (DTAP) signaling.

Figure 4:
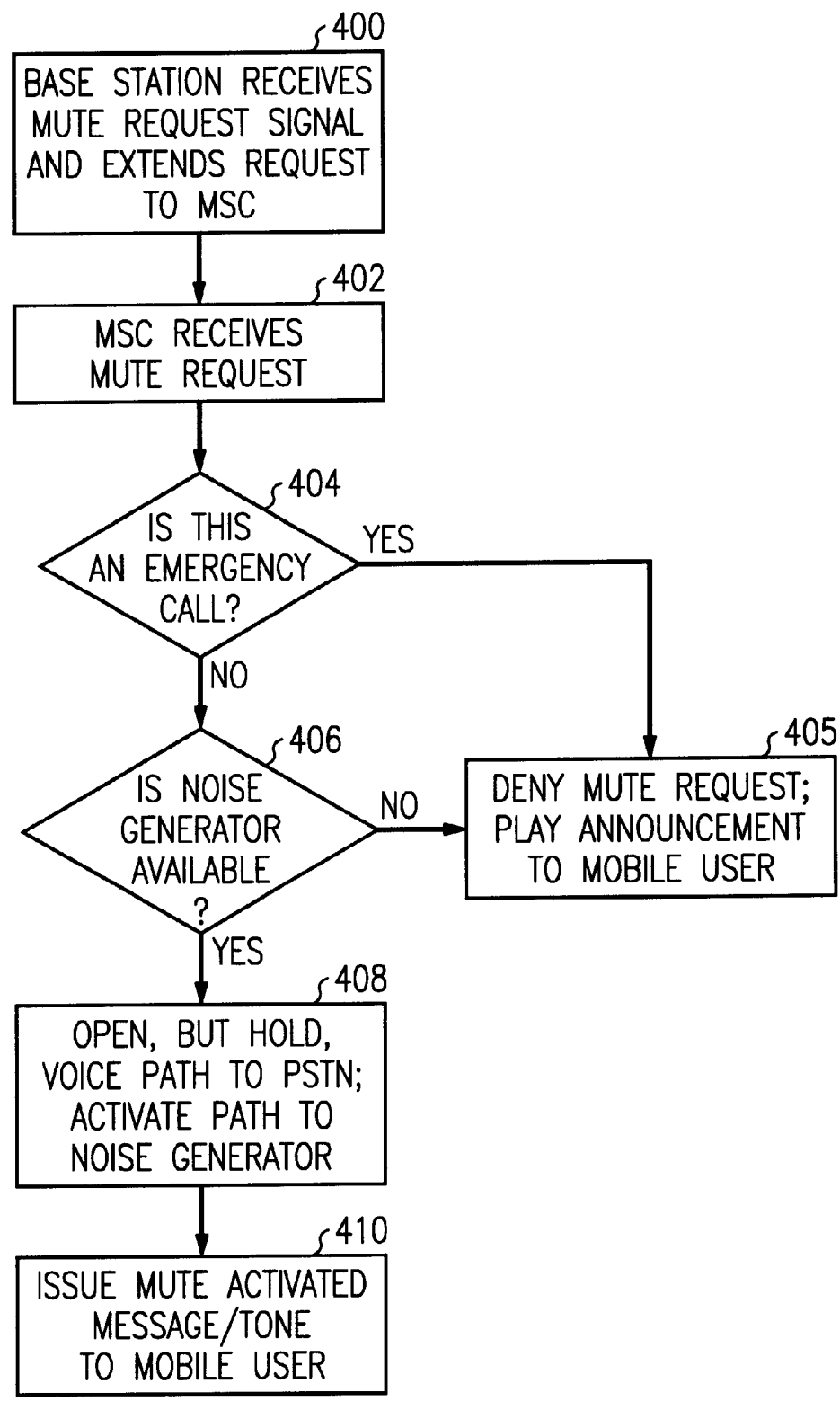
FIG. 4 is a flow diagram depicting the steps performed by a wireless telecommunications system for activating a network mute function.

FIG. 4 is a flow diagram depicting the steps performed in a wireless telecommunications system for activation of the network mute function. For purposes of example, assume that the network mute function is activated in wireless telecommunications system 100.

The process begins in step 400 in which a base station receives a network mute request signal from a mobile unit and extends this request to its serving mobile switching center. In this example, base station 120 receives a network request mute signal and extends it to MSC 140. In step 402, MSC 140 receives the network mute request. If the mobile user is roaming, standard inter-MSC handoff signaling is used to ensure that the serving MSC receives the network mute request from the mobile user.

The process continues to decision step 404 in which the MSC determines whether the ongoing call is an emergency (e.g., E911) call. If the outcome of decision step 404 is a "YES" determination, the process continues to step 405 in which the network mute request is denied and the MSC issues a tone or announcement to the mobile user indicating such. If the outcome of decision step 404 is a "NO" determination, the process continues to step 406 in which the MSC determines whether the noise generator is available to handle the newly received network mute request. MSC 140 checks on the status of the noise generator because these resources are intentionally limited to minimize space requirements. If the outcome of decision step 406 is a "NO" determination, the process returns to step 405 in which the MSC denies the network mute request and issues an announcement or tone to the mobile user via announcement/tone circuit 160. For example, the announcement or tone issued to the mobile user via serving base station 120 may indicate that the network mute function is not available but that the user may try again at a later time. If the outcome of decision step 406 is a "YES" determination, the process continues to step 408 in which the MSC opens the voice path from the mobile unit to the PSTN (or the called party) but holds the voice path resources. In the same step, the MSC activates a path from a portion of the open voice path to a noise generator for the insertion of non-obtrusive background noise to be played to the called party. The process continues to step 410 in which a network mute activated message or tone is issued to the mobile user via the announcement/tone circuit for indicating that the network mute function has been turned "on" and will remain active until the user elects to deactivate the function. Alternatively, a network mute signal may be visually displayed on the mobile unit.

Figure 5:
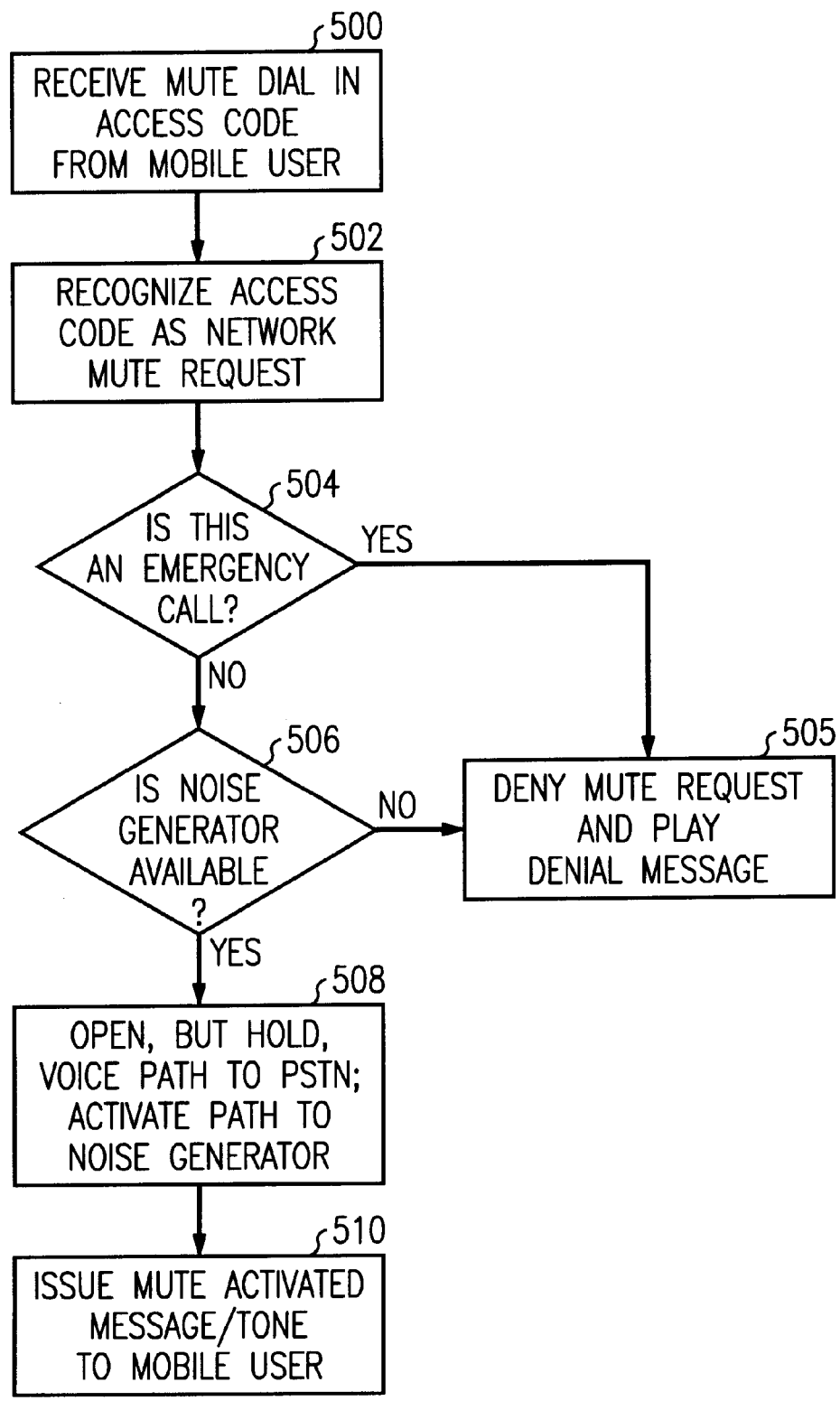
FIG. 5 is a flow diagram depicting the steps performed by a wireless telecommunications system for dial access code activation of a network mute function.

FIG. 5 is a flow diagram depicting the steps performed in a wireless telecommunications system in which the network mute function is activated by a dial access code. A dial access code is a predetermined set of signals (e.g., *77) which indicates to the wireless telecommunications system that a mobile unit user wishes to invoke the network mute feature.

Dial access code activation of a network mute feature begins in step 500 in which the serving MSC receives a dialed access code from a mobile user. This particular access code identifies activation of a network mute function. In step 502, the MSC recognizes the access code as the network mute request. The process continues to decision step 504 in which the MSC determines if the ongoing call is an E911 call. If the outcome of decision step 504 is a "YES" determination, the process continues to step 505 in which the network mute function request is denied. An announcement or tone from circuit 160 is issued to the mobile user to indicate the denial. If the outcome of decision step 504 is a "YES" determination, the process continues to decision step 506 in which the MSC determines if a noise generator is available to satisfy the network mute request. If the outcome of decision step 504 is a "NO" determination, the process returns to step 505 in which the network mute request is denied and an announcement or tone indicating such is issued to the mobile user. If the outcome of decision step 506 is a "YES" determination, the MSC opens the voice path interconnecting the mobile user to a called party served by the PSTN but holds the voice path resource. After opening the voice path to the called party, the called party is interconnected to a path associated with a noise generator. During activation of a network mute function, the called party does not hear ambient noise associated with the environment of the mobile user or wireless telecommunications transmission. Instead, the called party hears an unobtrusive background noise indicating that the mobile user is still on the call and can hear transmissions from the called party. The process ends in step 508 in which activation of the network mute function is confirmed by issuing an announcement or tone to the mobile user.

Figure 6:
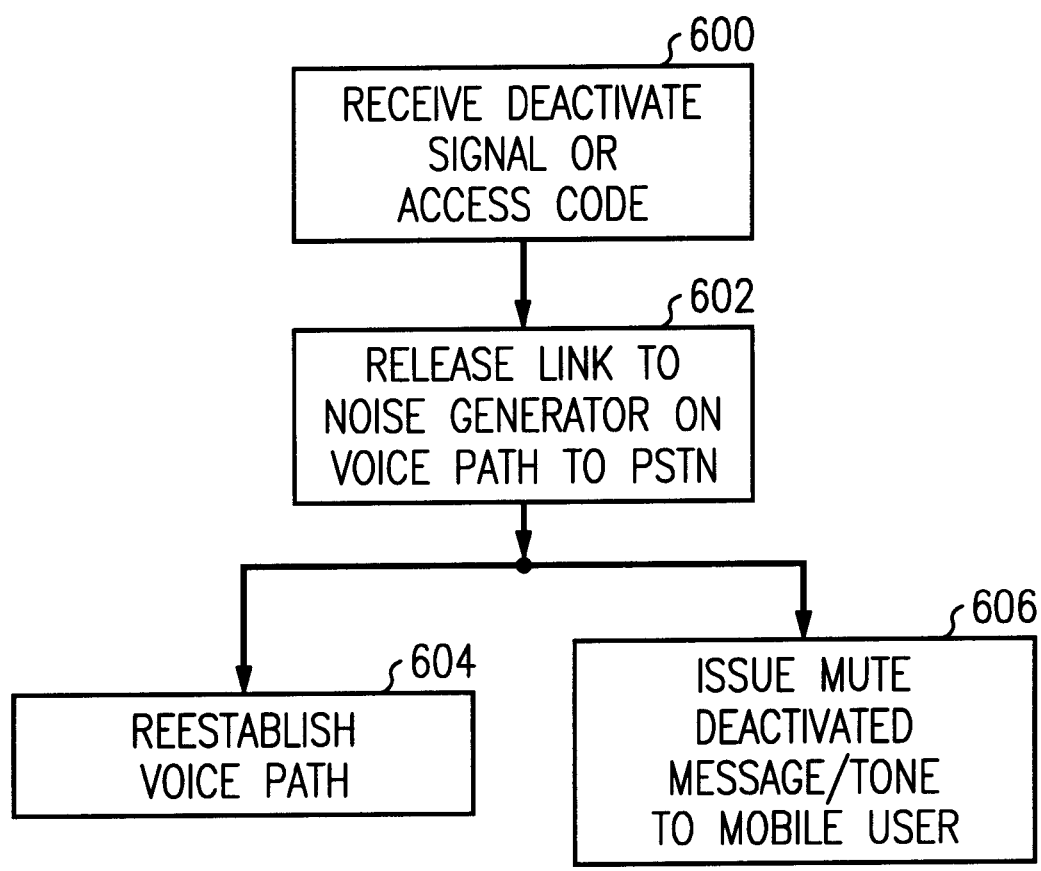
FIG. 6 is a flow diagram depicting the steps performed by a wireless telecommunications system for deactivation of a network mute function.

FIG. 6 shows a flow diagram of the steps required in a wireless telecommunications system to deactivate the network mute function. The process begins in step 600 in which the MSC receives a deactivate signal or deactivate dial access code associated with the network mute function. In step 602, the MSC recognizes the deactivate signal and releases the link from the voice path to the noise generator. In step 604, the MSC reconnects the previously opened voice path to the called party. In other words, this step, the MSC reestablishes a voice path as if the network mute function was not in effect. Simultaneously, in step 606, the MSC extends a mute deactivated announcement or tone to the mobile user.

Advantageously, implementation of the network mute feature in a wireless telecommunications system allows a mobile user to truly eliminate the ambient noise associated with the environment of the mobile unit and wireless telecommunications transmission. This feature may be deployed whether the mobile user is the calling or called party. Although this invention has been described with respect to a preferred embodiment, those skilled in the art may devise numerous other arrangements without departing from the scope of the invention as defined in the following claims.

What is claimed is:

1. A mobile unit served by a wireless telecommunications system, the mobile unit comprising:

a memory;

a processor interconnected to the memory;

a dual tone multifrequency (DTMF) tone generator interconnected to the processor, the dual tone multifrequency tone generator having a tone associated with a network mute function;

a signal generator interconnected to the processor for generating a signal initiating the network mute function; and wherein the network mute function responds to the signal by decoupling a voice path from the mobile unit to at least one other party and by continuing a voice path from the at least one other party to the mobile unit, whereby audio from the mobile unit is not transmitted to the at least one other party and audio from the at least one other party is transmitted to the mobile unit.

2. The mobile unit of claim 1 wherein the memory includes a segment for storing a network mute function signaling protocol.

3. The mobile unit of claim 1 wherein the signal generator produces a signal in response to activation of a network mute function.

4. The mobile unit of claim 1 further comprising means for deactivating the network mute function.

5. A method for activating a network mute feature comprising the steps of:

receiving in a mobile unit processor, a message from a tone generator indicating activation of the network mute feature;

retrieving a network mute protocol in response to receiving the message from the tone generator;

extending a signal to a serving base station, wherein the signal indicates that the network mute feature should be activated; and wherein the network mute feature responds to the signal by decoupling a voice path from the mobile unit to at least one other party and by continuing a voice path from the at least one other party to the mobile unit, whereby audio from the mobile unit is not transmitted to the at least one other party and audio from the at least one other party is transmitted to the mobile unit.

6. The method of claim 5 further comprising receiving a deactivate network mute feature request in a mobile unit processor; and the mobile unit extending a message requesting deactivation of the network mute feature.

7. The method of claim 5 further comprising the mobile unit displaying an indication that the network mute feature is active.

8. The method of claim 5 further comprising the mobile unit receiving a denial of activation of the network mute feature.

9. A mobile unit served by a wireless telecommunications system, the mobile unit comprising:

a memory;

a processor interconnected to the memory;

a signal generator interconnected to the processor for generating a signal initiating the network mute function; and wherein the network mute function responds to the signal by decoupling a voice path from the mobile unit to at least one other party and by continuing a voice path from the at least one other party to the mobile unit, whereby audio from the mobile unit is not transmitted to the at least one other party and audio from the at least one other party is transmitted to the mobile unit.

* * * * *

UNITED STATES PATENT AND TRADEMARK OFFICE
CERTIFICATE OF CORRECTION

PATENT NO. : 6,216,011 B1
DATED : April 10, 2001
INVENTOR(S) : Alex Lawrence Wierzbicki It is certified that error appears in the above-identified patent and that said Letters Patent is hereby corrected as shown below:

<u>Column 1,</u>
Line 24, under "BACKGROUND OF THE INVENTION," make the following changes: change "modem" to -- modern --.

Signed and Sealed this

Second Day of August, 2005

JON W. DUDAS
*Director of the United States Patent and Trademark Office*